US012522375B2

(12) United States Patent
Hellman et al.

(10) Patent No.: US 12,522,375 B2
(45) Date of Patent: Jan. 13, 2026

(54) BRACE FOR FUSELAGE REPAIRS

(71) Applicant: THE BOEING COMPANY, Arlington, VA (US)

(72) Inventors: Clifford Hellman, Carnation, WA (US); Bryan J. Gruner, Bellevue, WA (US); Gregory P. Leigh, Kirkland, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/614,412

(22) Filed: Mar. 22, 2024

(65) Prior Publication Data

US 2025/0296703 A1   Sep. 25, 2025

(51) Int. Cl.
 *B64F 5/40*   (2017.01)
(52) U.S. Cl.
 CPC ..................... *B64F 5/40* (2017.01)
(58) Field of Classification Search
 CPC ................... B23P 2700/01; B64F 5/45
 USPC .............. 405/142; 254/133 R, 134, 133 A, 254/351–362; 248/651–654; 29/897.5
 See application file for complete search history.

(56) References Cited

U.S. PATENT DOCUMENTS

| | | | | |
|---|---|---|---|---|
| 1,392,355 A * | 10/1921 | Rhode | ............... | B60S 9/06 |
| | | | | 254/133 R |
| 2,185,550 A * | 1/1940 | Gerdes | ............... | B21D 1/12 |
| | | | | 254/133 R |
| 2,259,533 A * | 10/1941 | Pfauser | ............... | B25B 27/308 |
| | | | | 29/239 |
| 2,263,247 A * | 11/1941 | Raisanen | ............... | B21D 1/12 |
| | | | | 254/133 R |
| 2,802,635 A * | 8/1957 | Engelbart | ............... | B66F 3/24 |
| | | | | 248/163.1 |
| 2,974,931 A * | 3/1961 | Reel | ............... | B60P 7/15 |
| | | | | 410/151 |
| 3,292,903 A * | 12/1966 | Meyer | ............... | B65H 75/005 |
| | | | | 72/392 |
| 3,635,440 A * | 1/1972 | Van Gompel | ............... | B21C 47/30 |
| | | | | 254/124 |
| 3,815,202 A * | 6/1974 | Squires | ............... | F16L 1/09 |
| | | | | 29/282 |
| 3,819,153 A * | 6/1974 | Hurst | ............... | B66F 3/24 |
| | | | | 72/392 |
| 3,823,566 A * | 7/1974 | Handewith | ............... | E21D 23/0095 |
| | | | | 405/142 |
| 4,429,857 A * | 2/1984 | Ferguson | ............... | B25B 27/026 |
| | | | | 29/252 |

(Continued)

*Primary Examiner* — Jason L Vaughan
(74) *Attorney, Agent, or Firm* — Yee & Associates, P.C.

(57) ABSTRACT

The present disclosure provides a brace having a first leg and a second leg offset from the first leg. The brace also has a pivot assembly having a bar pivotably coupled with the first leg to define a first pivot point and pivotably coupled with the second leg to define a second pivot point. The brace further includes first and second attachment assemblies coupled with the first leg and the second leg, respectively, and each arranged to couple to a portion of a structure. In addition, the brace includes an actuator assembly coupling the first leg with the second leg and having an actuator arranged to pivot, or maintain a position of, the first leg relative to the first pivot point and to pivot, or maintain the position of, the second leg relative to the second pivot point so as to control a load on, and deflection of, the structure.

20 Claims, 6 Drawing Sheets

(56) References Cited

U.S. PATENT DOCUMENTS

| | | | | |
|---|---|---|---|---|
| 4,564,057 A * | 1/1986 | Zrostlik | ............ | B60C 25/02 157/1 |
| 4,627,590 A * | 12/1986 | Zeorlin | ............ | B64D 29/08 248/351 |
| 4,629,146 A * | 12/1986 | Lymons | ............ | B64D 29/08 244/129.4 |
| 4,845,825 A * | 7/1989 | Gleason | ............ | B25B 5/061 29/261 |
| 5,125,158 A * | 6/1992 | Casebolt | ............ | B26B 15/00 30/228 |
| 5,215,288 A * | 6/1993 | Lyon | ............ | B60P 7/15 254/113 |
| 6,443,430 B1 * | 9/2002 | Eisterlehner | ............ | A62B 3/005 254/133 R |
| 8,002,229 B2 * | 8/2011 | Hewson | ............ | E04G 25/06 248/161 |
| 2003/0222191 A1 * | 12/2003 | Tsai | ............ | B62H 3/00 248/354.1 |

* cited by examiner

BRACE FOR FUSELAGE REPAIRS

FIELD

Aspects of the present disclosure relate to repair of structures, such as aircraft fuselages.

BACKGROUND

On rare occasions incidents can occur that lead to damage of a keel of the airplane. Instead of writing off the airplane, it may be desirable to repair the damaged structure on the bottom of the airplane, which can include skins, stringers, frames, and other structures. Before removing the damaged structure, it may be beneficial to brace the undamaged areas of the airplane so that the shape of the airplane is maintained and so that new structural components can be installed while maintaining tight tolerances and no or negligible preload. Conventional devices for bracing an airplane fuselage for repairs are generally large static cradles with minimal ability for adjustment. Moreover, such conventional devices can typically only be installed at specific station locations where there are bulkheads, limiting where such devices can be located. If the airplane is damaged at the bulkheads, then the fuselage can require large amounts of bracing to compensate, including beams that pass through the windows of the airplane. These cradles and beams also often have to be built each time there is a new repair because they are very large and not easily transported.

SUMMARY

The present disclosure provides a brace in one aspect, the braces includes a first leg; a second leg offset from the first leg; a pivot assembly having a bar pivotably coupled with the first leg to define a first pivot point and pivotably coupled with the second leg to define a second pivot point; first and second attachment assemblies coupled with the first leg and the second leg, respectively, and each arranged to couple to a portion of a structure; and an actuator assembly coupling the first leg with the second leg and having an actuator arranged to pivot, or maintain a position of, the first leg relative to the first pivot point and to pivot, or maintain the position of, the second leg relative to the second pivot point so as to control a load on, and deflection of, the structure.

In one aspect, in combination with any example brace above or below, the first attachment assembly is arranged to couple to a first portion of the structure and the second attachment assembly is arranged to couple to a second portion of the structure, and wherein the first and second portions of the structure are separated by a damaged section or a removed section of the structure.

In one aspect, in combination with any example brace above or below, the first leg has a first end and a second end, and wherein the actuator assembly is pivotably coupled with the first end of the first leg and the first attachment assembly is coupled with a first foot of the first leg at the second end of the first leg, and the second leg has a first end and a second end, and wherein the actuator assembly is coupled with the first end of the second leg and the second attachment assembly is coupled with a second foot of the second leg at the second end of the second leg.

In one aspect, in combination with any example brace above or below, the first attachment assembly has a first attachment fitting having a coupler, first and second extenders, and first and second fittings, and wherein the coupler is coupled with the first leg, the first and second extenders extend outward from the coupler in opposing directions, and the first fitting is connected to the first extender and the second fitting is connected to the second extender.

In one aspect, in combination with any example brace above or below, the first attachment assembly has a first bookend fitting and a second bookend fitting, and wherein the first fitting and the first bookend fitting are adapted to receive, and secure, a first frame of the structure therebetween and the second fitting and the second bookend fitting are adapted to receive, and secure, a second frame of the structure therebetween, the first frame and the second frame being spaced from one another.

In one aspect, in combination with any example brace above or below, the first extender has a first housing and a slider that is slidable relative to the first housing, and wherein the first fitting is connected to the slider.

In one aspect, in combination with any example brace above or below, the first leg has a backbone, a flange extending from the backbone, and a foot, and wherein the actuator assembly and the pivot assembly are coupled with the flange and the first attachment assembly is coupled with the foot.

In one aspect, in combination with any example brace above or below, a distance that the flange extends from the backbone varies along a length of the flange, and wherein a notch is defined between an actuator joint where the actuator assembly couples to the first leg and a pivot joint where the pivot assembly couples to the first leg, and wherein the flange tapers from the pivot joint to the foot.

In one aspect, in combination with any example brace above or below, the pivot assembly has a first clevis coupling the bar with the first leg and a second clevis coupling the bar with the second leg, and wherein the first and second clevises are coupled with the first and second legs at a first pivot joint and a second pivot joint, respectively, and the bar is static so as to maintain a spacing between the first and second pivot points.

In one aspect, in combination with any example brace above or below, the brace further includes a load cell placed in-line with the actuator.

In one aspect, in combination with any example brace above or below, the braces further includes a strain gauge arranged on the bar.

The present disclosure provides a repair system in another aspect. The repair system includes a brace having a first leg; a second leg offset from the first leg; a pivot assembly having a bar pivotably coupled with the first leg to define a first pivot point and pivotably coupled with the second leg to define a second pivot point; first and second attachment assemblies coupled with the first leg and the second leg, respectively, and each arranged to couple to a portion of a structure; an actuator assembly coupling the first leg and the second leg, the actuator assembly having an actuator; and a sensor. The repair system also includes a computing system comprising one or more processors and one or more memory devices storing a program, which, when executed by any combination of the one or more processors, causes the one or more processors to perform an operation, the operation comprising: receiving feedback from the sensor; and performing at least one of: i) causing, based at least in part on the feedback, the actuator to pivot, or maintain a position of, the first and second legs relative to the first and second pivot points, respectively, so as to control a load on, and deflection of, the structure; or ii) presenting the feedback or a target displacement or load associated with the brace determined based at least in part on the feedback.

The present disclosure provides a method in yet another aspect. The method includes coupling a brace to a structure so that a first attachment assembly couples to a first portion of the structure and a second attachment assembly couples to a second portion of the structure; and adjusting an actuator of the brace to pivot first and second legs of the brace relative to respective first and second pivot points so as to control a load on, and deflection of, the structure, wherein the first attachment assembly is coupled with the first leg and the second attachment assembly is coupled with the second leg, and wherein the first pivot point is defined at a first pivot joint where a bar is coupled with the first leg and the second pivot point is defined at a second pivot joint where the bar is coupled with the second leg.

In one aspect, in combination with any example method above or below, the actuator is adjusted based at least in part on feedback from a strain gauge arranged on the bar, based at least in part on feedback from a load cell arranged in-line with the actuator, or both.

In one aspect, in combination with any example method above or below, the structure is a fuselage defining a longitudinal centerline and a radial direction, and wherein the brace is coupled with the fuselage in such a way that the first and second legs extend from the first and second attachment assemblies, respectively, inward toward the longitudinal centerline so that the bar is arranged inward of the fuselage along the radial direction and the actuator is arranged inward of the bar along the radial direction, wherein the bar is coupled with the first leg at a mid-span point of the first leg or to a point that is between the mid-span point and an end of the first leg opposite the first attachment assembly, and the bar is coupled with the second leg at a mid-span point of the second leg or to a point that is between the mid-span point of the second leg and an end of the second leg opposite the second attachment assembly.

In one aspect, in combination with any example method above or below, the structure includes a first frame and a second frame spaced from the first frame, and wherein coupling the brace to the structure comprises coupling the first attachment assembly to the first frame and the second frame so that a first fitting and a first bookend fitting are coupled with one another with the first frame sandwiched therebetween and so that a second fitting and a second bookend fitting are coupled with one another with the second frame sandwiched therebetween.

In one aspect, in combination with any example method above or below, the method further includes drilling holes in the first fitting and in the first bookend fitting to match a pattern of existing holes in the first frame.

In one aspect, in combination with any example method above or below, the first portion and the second portion of the structure are spaced by a damaged section or a removed section of the structure.

In one aspect, in combination with any example method above or below, the method further includes scanning the structure; generating a model of the structure based at least in part the scanning; and comparing the model to a baseline model to determine a deviation, and wherein the actuator is adjusted based at least in part on the deviation.

In one aspect, in combination with any example method above or below, the brace is one of a plurality of braces coupled with the structure, and wherein the method further includes controlling, based at least in part on sensor feedback from each one of the plurality of braces, an actuator of each one of the plurality of braces in coordination so as to distribute a load applied to the structure according to a predetermined distribution.

BRIEF DESCRIPTION OF THE DRAWINGS

So that the manner in which the above recited features can be understood in detail, a more particular description, briefly summarized above, may be had by reference to example aspects, some of which are illustrated in the appended drawings.

DETAILED DESCRIPTION

The present disclosure provides a brace for aircraft fuselage repair as well as repair systems and methods of repair using the brace. In one example aspect, a brace is provided that can be coupled with a structure, such as to a fuselage during a repair. The brace is capable of being installed at many locations along the fuselage (e.g., at any frame location along a length of the fuselage) and can apply varying amounts of force by adjustment of an actuator of the brace. The brace can be actively monitored using an integrated load cell and/or strain gauge to check loads and strains, and based on such feedback, the brace can be adjusted during use. Accordingly, feedback from these devices can ensure that the brace accurately controls the load on, and the deflection of, the structure without overloading it. In some aspects, multiple braces can be installed at various locations along the length of the fuselage depending on the extent of the damage and how much structure is to be removed/replaced. This can allow for more extensive disassembly of the structure than is possible with current solutions.

The brace and repair systems and methods utilizing the brace can provide certain advantages, benefits, and/or technical effects. For instance, the brace of the present disclosure can offer a tailorable solution to address a wide range of fuselage repairs and provides active load/strain monitoring and control. As noted above, an actuator of the brace can utilize the load/strain feedback to make adjustments in real time. Further, the construction of the brace allows for the bracing of the airplane structure from inside or outside the fuselage, providing flexibility to a repair. The brace is also constructed to elude or not interfere with aircraft systems when mounted on the inside, which helps to avoid disassembly of systems and interior components. The brace can also be quickly installed or uninstalled to facilitate rapid repairs and can be easily transported. Further, fittings attaching the brace to the structure can be match drilled to existing fastener holes on the undamaged structure, and in some instances, can be sacrificial. An example brace, repair system, and method are disclosed below.

Figure 1A:
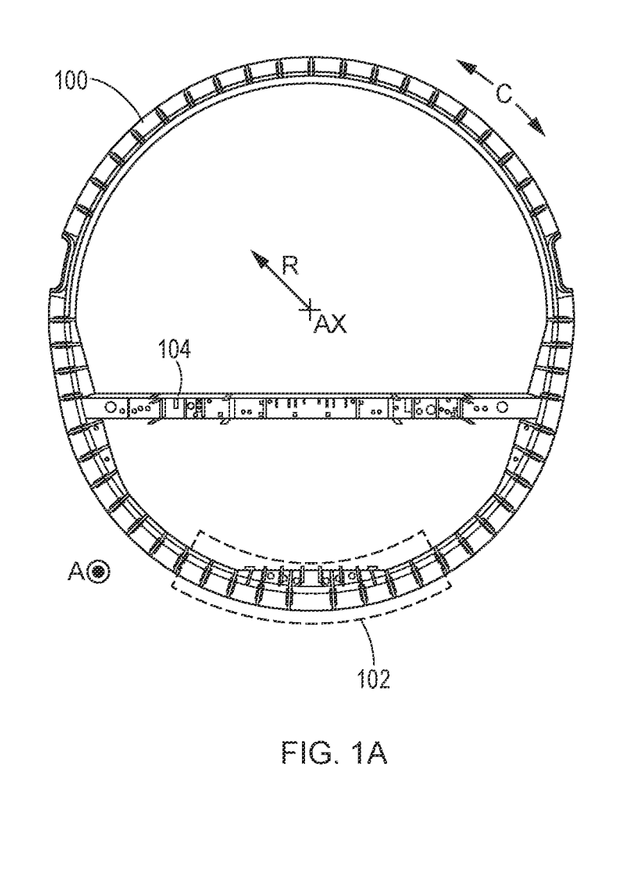
FIGS. 1A and 1B depict a brace supporting a fuselage undergoing a repair according to an example aspect of the present disclosure.
Figure 1B:
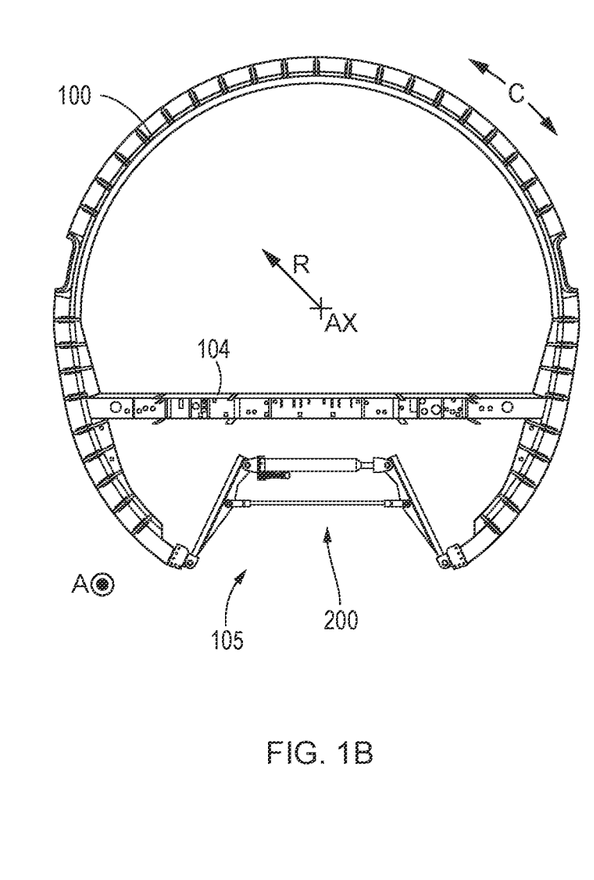

Turning now to the drawings, FIGS. 1A and 1B depict a fuselage 100 undergoing a repair according to an example aspect of the present disclosure. Particularly, FIG. 1A is a sectional view of the fuselage 100 and depicts the fuselage 100 having a damaged section 102 at its keel or bottom portion. FIG. 1B is another sectional view of the fuselage 100, taken at the same cutting plane as in FIG. 1A, and depicts the damaged section 102 removed with a brace 200 supporting the undamaged sections of the fuselage 100. For reference, the fuselage 100 can define an axial direction A (going into an out of the page in FIGS. 1A and 1B), a radial direction R, and a circumferential direction C. The fuselage 100 also defines a longitudinal centerline AX extending along the axial direction A.

During a repair, the brace 200 can provide support to the fuselage 100, e.g., to brace the undamaged areas of the fuselage 100 so that the shape of the fuselage 100 is maintained and so that new structural components can be installed while maintaining tight tolerances and no or negligible preload. The brace 200 can be positioned in the location where the damaged section 102 has been removed. In this example, the damaged section 102 is located at the keel of the fuselage 100, but in other aspects, the brace 200 can be arranged at the crown (or top portion of the fuselage 100), the port side of the fuselage 100, the starboard side of the fuselage 100, some combination thereof, etc. A floorboard 104 can span laterally across and connect the port and starboard sides of the fuselage 100 as shown in FIGS. 1A and 1B.

In at least some example aspects, the brace 200 is arranged to avoid possible obstacles or systems that may be present within the fuselage 100, such as cables, ducts, wiring, fuel systems, hydraulic lines, etc. Such systems can be a hassle to uninstall and/or reinstall, and in some instances, approval or recertification may be needed after such systems have been reinstalled. Thus, avoiding such obstacles can be beneficial. In FIG. 1B, the brace 200 is arranged to go "up and over" such obstacles instead of spanning directly across a removed section 105 of the fuselage 100 from one undamaged end to another. In this regard, the components of the brace 200 that span across the removed section 105 are arranged radially inward of where the damaged section 102 used to be (or where a new section will be installed), with respect to the longitudinal centerline AX. In some alternative aspects, the components of the brace 200 that span across the removed section 105 can be arranged radially outward of where the damaged section 102 used to be (or where a new section will be installed), with respect to the longitudinal centerline AX.

Figure 2:
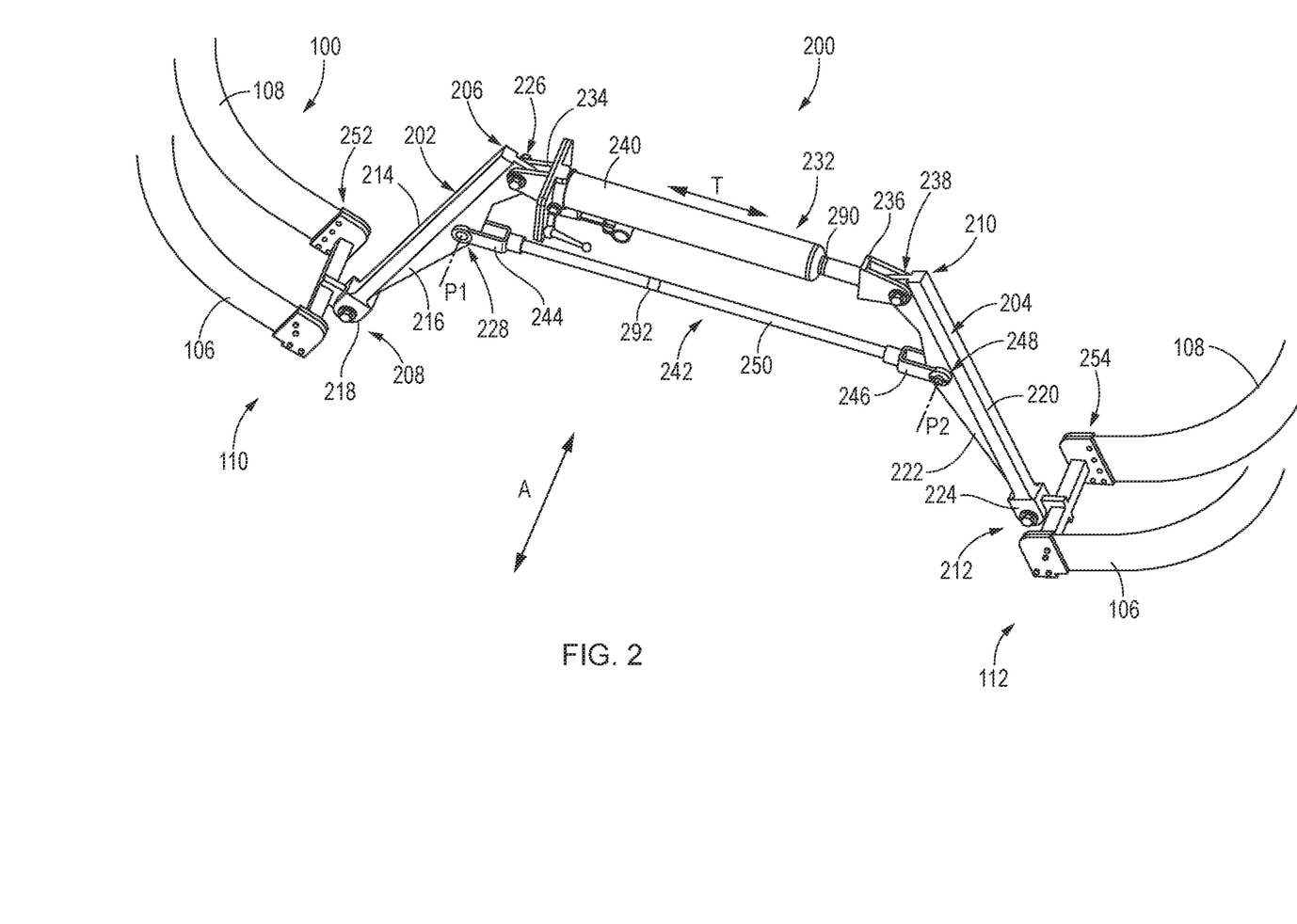
FIG. 2 is a perspective view of the brace of FIG. 1 being coupled with the fuselage.

FIG. 2 is a close-up perspective view of the brace 200 being coupled with the fuselage 100. As illustrated in FIG. 2, the brace 200 includes a pair of legs, including a first leg 202 and a second leg 204. The first and second legs 202, 204 are offset from one another. That is, the first and second legs 202, 204 are spaced from one another. The first leg 202 extends between a first end 206 and a second end 208. Likewise, the second leg 204 extends between a first end 210 and a second end 212. When positioned in place relative to the fuselage 100, the first and second legs 202, 204 both extend generally lengthwise radially, e.g., to facilitate avoidance of obstacles as explained above.

The first and second legs 202, 204 are each constructed with a backbone, a mounting flange, and a foot. Particularly, the first leg 202 includes a first backbone 214 and a first flange 216 extending from the first backbone 214. The first leg 202 also includes a first foot 218 connected to the first backbone 214, e.g., at the second end 208 of the first leg 202. Similarly, the second leg 204 includes a second backbone 220 and a second flange 222 extending from the second backbone 220. The second leg 204 also includes a second foot 224 connected to the second backbone 220, e.g., at the second end 212 of the second leg 204. Moreover, the first and second legs 202, 204 are arranged relative to one another so that the first flange 216 extends from the first backbone 214 toward the second leg 204 and so that the second flange 222 extends from the second backbone 220 toward the first leg 202. The first and second backbones 214, 220 provide structural stability to their respective first and second legs 202, 204 and the first and second flanges 216, 222 provide a support structure for various components to be mounted. The first foot 218 and the second foot 224, or feet of the first and second legs 202, 204, provide a mounting platform for attachment fittings that couple to respective ends of the undamaged portions of the fuselage 100.

Figure 3:
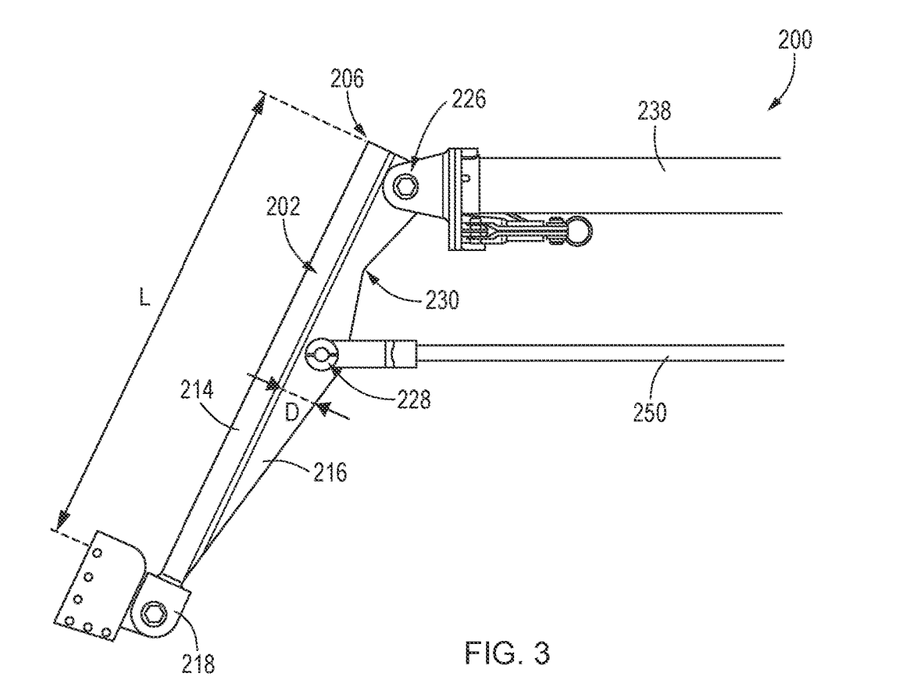
FIG. 3 is a front view of a portion of the brace of FIG. 2.

In some example aspects, as shown in FIG. 3, a distance D that the first flange 216 extends from the first backbone 214 can vary along a length L of the first flange 216. The distance D of the first flange 216 is generally greatest at a first actuator joint 226 of the first flange 216 (located at or adjacent the first end 206) and at a first pivot joint 228 of the first flange 216 (located at an intermediate span location of the first leg 202). A notch 230 is defined between the first actuator joint 226 and the first pivot joint 228. The distance D of the first flange 216 generally tapers from the first pivot joint 228 to the first foot 218. The extended portions of the first leg 202 (i.e., at the first actuator joint 226 and the first pivot joint 228) provide structural integrity at the mounting locations while the notch 230 and tapered section of the first leg 202 can reduce the overall weight of the brace 200, as well as assist with avoiding obstacles. The second flange 222 of the second leg 204 can be similarly arranged as the first flange 216 of the first leg 202.

With reference again to FIG. 2, the brace includes an actuator assembly 232. The actuator assembly 232 spans between and couples the first leg 202 and the second leg 204. More specifically, the actuator assembly 232 includes a first clevis 234 coupled with the first leg 202 at the first end 206 via a bolted connection. The first actuator joint 226 thus joins the first clevis 234 of the actuator assembly 232 and the first leg 202. A spherical bearing can be installed at the first actuator joint 226, e.g., to reduce or prevent induced moments in the fuselage 100 or structure to which the brace 200 is coupled. The spherical bearing can be inserted into an opening defined by the first flange 216. A bolt can be slid through an opening defined by a first arm of the first clevis 234, through the spherical bearing (and consequently the opening defined by the first flange 216), and then through an opening defined by a second arm of the first clevis 234. The bolt can then be secured, e.g., by a nut or the like. The bolted connection can assist with rapid installation or disassembly of the brace 200, for example. The actuator assembly 232 also includes a second clevis 236 coupled with the second leg 204 at the first end 210 via a bolted connection. The second clevis 236 can be coupled with the second leg 204 in a same manner as the first clevis 234 is coupled with the first leg 202. A second actuator joint 238 thus joins the second clevis 236 of the actuator assembly 232 and the second leg 204.

Figure 4:
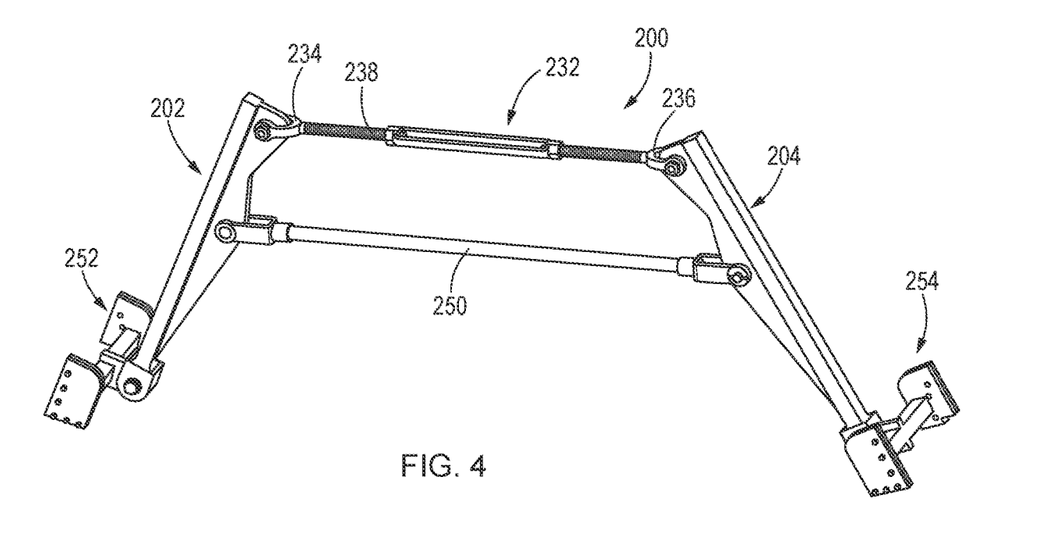
FIG. 4 is a perspective view of a brace according to another example aspect of the present disclosure.

The actuator assembly 232 includes an actuator 240 positioned between the first and second clevises 234, 236. The actuator 240 is operable to control a distance between the first ends 206, 210 of the first and second legs 202, 204 (and consequently the second ends 208, 212 as well). For instance, the actuator 240 can be used to move the first and second legs 202, 204 relative to one another, e.g., by pulling them closer together or by pushing the first and second legs 202, 204 apart. To change the distance between the first ends 206, 210 of the first and second legs 202, 204, a rod of the actuator 240 can be moved along a travel direction T, or rather, the stroke of the actuator 240 can be adjusted. The actuator 240 can also be used to maintain the static positions of the first and second legs 202, 204. That is, the actuator 240 can maintain the distance between the first and second legs 202, 204. The actuator 240 can be any suitable type of actuator, such as a screw jack or turnbuckle or any other suitable actuator that can move the first and second legs 202, 204 closer together, further apart, or maintain the spacing of the first and second legs 202, 204. The actuator 240 can be an electric actuator, a hydraulic actuator, a pneumatic actuator, or another suitable type of actuator. FIG. 3 shows the actuator 240 configured as a hydraulic actuator while FIG. 4 shows the actuator 240 configured as a turnbuckle actuator.

As further shown in FIG. 2, the brace 200 also includes a pivot assembly 242. The pivot assembly 242 spans between and connects the first and second legs 202, 204. Particularly, the pivot assembly 242 includes a first clevis 244 and a second clevis 246. The first clevis 244 can be coupled to a mid-span point of the first leg 202 (which is halfway between the first and second ends 206, 208) or to a point that is closer to the first end 206 than the second end 208 of the first leg 202 via a bolted connection. The first pivot joint 228 thus joins the first clevis 244 of the pivot assembly 242 and the first leg 202. A spherical bearing can be installed at the first pivot joint 228, e.g., to reduce or prevent induced moments in the fuselage 100 or structure to which the brace 200 is coupled. The spherical bearing can be inserted into an opening defined by the first flange 216. A bolt can be slid through an opening defined by a first arm of the first clevis 244, through the spherical bearing (and consequently the opening defined by the first flange 216), and then through an opening defined by a second arm of the first clevis 244. The bolt can then be secured, e.g., by a nut or the like. The bolted connection can assist with rapid installation or disassembly of the brace 200, for example. The second clevis 246 is coupled to a mid-span point of the second leg 204 (which is halfway between the first and second ends 210, 212) or to a point that is closer to the first end 212 than the second end 214 of the second leg 204. The second clevis 246 can be coupled with the second leg 204 in a same manner as the first clevis 244 is coupled with the first leg 202. A second pivot joint 248 thus joins the second clevis 246 of the pivot assembly 242 and the second leg 204.

The pivot assembly 242 also includes a bar 250 arranged between and coupled to the first and second clevises 242, 244. The bar 250 has a fixed length and is thus a "static bar". Generally, the bar 250 enables the pivot assembly 242 to function as a pivot element of the brace 200, or rather, to provide leverage so that a mechanical advantage can be achieved. Specifically, the bar 250 is pivotably coupled with the first leg 202 via the first pivot joint 228 to define a first pivot point P1 (or first pivot axis, which extends along the axial direction A in the example of the FIG. 2). The bar 250 is also pivotably coupled with the second leg 204 via the second pivot joint 248 to define a second pivot point P2 (or second pivot axis, which extends along the axial direction A in the example of the FIG. 2). Accordingly, when the actuator 240 moves the first ends 206, 210 of the first and second legs 202, 204 relative to one another, the bar 250 of the pivot assembly 242 maintains the spacing or offset between the first and second legs 202, 204 but yet the pivot assembly 242 allows the first leg 202 to pivot about the first pivot point P1 and the second leg 204 to pivot about the second pivot point P2.

Particularly, when the actuator 240 moves the first ends 206, 210 of the first and second legs 202, 204 closer together, the bar 250 of the pivot assembly 242 maintains the spacing or offset between the first and second legs 202, 204 but the first leg 202 is allowed to pivot about the first pivot point P1 in a clockwise direction from the perspective in FIG. 2 and the second leg 204 is allowed to pivot about the second pivot point P2 in a counterclockwise direction from the perspective in FIG. 2. When the actuator 240 moves the first ends 206, 210 of the first and second legs 202, 204 further apart, the bar 250 of the pivot assembly 242 maintains the spacing or offset between the first and second legs 202, 204 but the first leg 202 is allowed to pivot about the first pivot point P1 in a counterclockwise direction from the perspective in FIG. 2 and the second leg 204 is allowed to pivot about the second pivot point P2 in a clockwise direction from the perspective in FIG. 2. When the actuator 240 maintains the spacing between the first ends 206, 210 of the first and second legs 202, 204, the first and second legs 202, 204 do not rotate relative to their respective pivot points P1, P2. Accordingly, the actuator 240 is arranged to pivot, or maintain a position of, the first leg 202 relative to the first pivot point P1 and to pivot, or maintain the position of, the second leg 204 relative to the second pivot point P2 so as to control a load on, and deflection of, the structure to which the brace 200 is coupled, which is the fuselage 100 in this example.

The brace 200 includes a pair of attachment assemblies that couple the brace 200 with a structure, such as the fuselage 100 as depicted in FIG. 2. For instance, in the example of FIG. 2, the brace 200 includes a first attachment assembly 252 coupled with the second end 208 of the first leg 202. Similarly, the brace 200 includes a second attachment assembly 254 coupled with the second end 212 of the second leg 204. As illustrated in FIG. 2, the first attachment assembly 252 couples the brace 200 to two frames of the fuselage 100, including a first frame 106 and a second frame 108 spaced from the first frame 106 along the axial direction A. The second attachment assembly 254 couples the brace 200 to the first frame 106 and the second frame 108 as well. The first attachment assembly 252 couples the brace 200 to the first and second frames 106, 108 at a first portion 110 of the fuselage 100 (e.g., a first undamaged end thereof) and the second attachment assembly 254 couples the brace 200 to the first and second frames 106, 108 at a second portion 112 of the fuselage 100 (e.g., a second undamaged end thereof).

Figure 5:
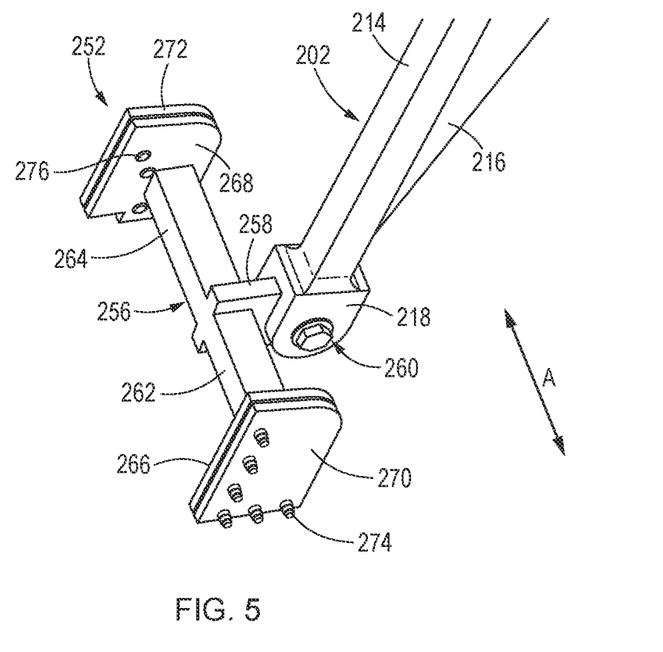
FIG. 5 is a perspective view of an attachment assembly of the brace of FIG. 2.

With reference now to FIG. 5, the first attachment assembly 252 has a first attachment fitting 256 coupled with the first foot 218 of the first leg 202. More particularly, the first foot 218 is arranged as a clevis, which can be coupled with a first coupler 258 of the first attachment fitting 256 via a bolted connection. A first foot joint 260 thus joins the first foot 218 and the first attachment fitting 256. A spherical bearing can be installed at the first foot joint 260, e.g., to reduce or prevent induced moments in the fuselage 100 or structure to which the brace 200 is coupled. The spherical bearing can be inserted into an opening defined by the first coupler 258. A bolt can be slid through an opening defined by a first arm of the first foot 218, through the spherical bearing (and consequently the opening defined by the first coupler 258), and then through an opening defined by a second arm of the first foot 218. The bolt can then be secured, e.g., by a nut or the like. The bolted connection can assist with rapid installation or disassembly of the brace 200, for example.

Further, the first attachment fitting 256 has first and second extenders 262, 264 that extend outward from the first coupler 258 in opposing directions (e.g., fore and aft directions along the axial direction A). The first attachment fitting 256 also has a first fitting 266 that is connected to a distal end of the first extender 262 and a second fitting 268 that is connected to a distal end of the second extender 264. The can be constructed as plates, for example. In this example, the plates, or first and second fittings 266, 268, are arranged in parallel planes that are orthogonal to the axial direction A. However, other arrangements are possible.

The first attachment assembly 252 also includes first and second bookend fittings 270, 272. In this example, the first and second bookend fittings 270, 272 are shaped complementary to their corresponding first and second fittings 266, 268, but need not be in other aspects. The first bookend fitting 270 is removably coupled with the first fitting 266. That is, the first bookend fitting 270 can be coupled with the first fitting 266, e.g., by one or more fasteners, but can also be removed therefrom or uncoupled as desired. As shown in FIG. 2, a portion of the first frame 106 can be sandwiched between the first fitting 266 and the first bookend fitting 270, and fasteners 274 can be inserted through respective openings defined by the first fitting 266, through corresponding respective holes in the first frame 106, and through corresponding respective holes in the first bookend fitting 270. Accordingly, the first fitting 266 and the first bookend fitting 270 can be secured to the first frame 106 at the first portion 110.

The second bookend fitting 272 is removably coupled with the second fitting 268. Thus, the second bookend fitting 272 can be coupled with the second fitting 268, e.g., by one or more fasteners, but can also be removed therefrom or uncoupled as desired. As depicted in FIG. 2, a portion of the second frame 108 can be sandwiched between the second fitting 268 and the second bookend fitting 272, and fasteners 276 can be inserted through respective openings defined by the second fitting 268, through corresponding respective holes in the second frame 108, and through corresponding respective holes in the second bookend fitting 272. Accordingly, the second fitting 268 and the second bookend fitting 272 can be secured to the second frame 108 at the first portion 110.

The second attachment assembly 254 can be configured in a same or similar manner as the first attachment assembly 252. Accordingly, as shown in FIG. 2, a first fitting and a first bookend fitting of the second attachment assembly 254 can be secured to the first frame 106 at the second portion 112 and a second fitting and a second bookend fitting of the second attachment assembly 254 can be secured to the second frame 108 at the second portion 112.

In some example aspects, the first attachment fitting 256 of the first attachment assembly 252 and/or the attachment fitting of the second attachment assembly 254 can be exchanged with an attachment fitting having longer or shorter extenders as needed to fit the airplane structure. In some alternative aspects, the first and/or second attachment assemblies 252, 254 can include telescoping features that enables the brace 200 to fit the airplane structure, or rather, to adjust to frames having various spacing (e.g., various axial spacing) so that the brace 200 can be coupled thereto.

Figure 6:
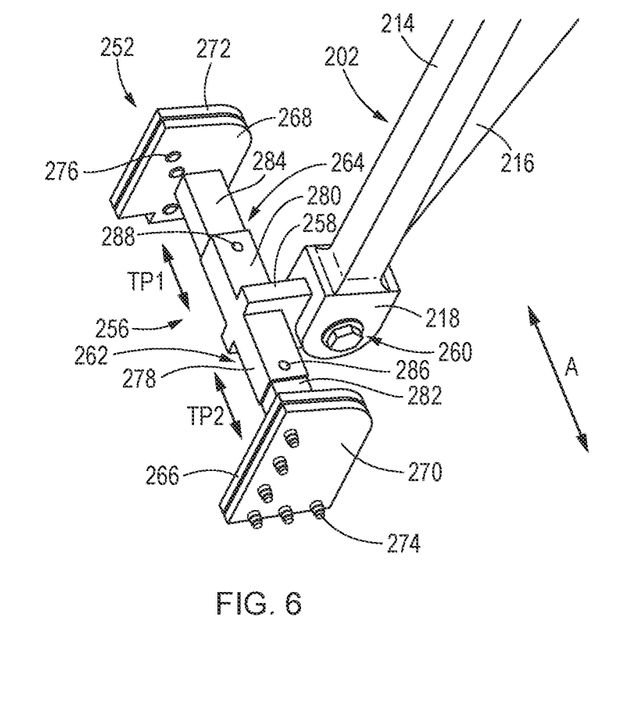
FIG. 6 is a perspective view of another attachment assembly that can be incorporated into the brace of FIG. 2.

By way of example, FIG. 6 is a perspective view of an alternative configuration of the first attachment assembly 252 that can be incorporated into the brace 200. The first attachment assembly 252 of FIG. 6 is configured in a similar manner as the first attachment assembly 252 of FIG. 5 except as provided below. In FIG. 6, the first and second extenders 262, 264 each have first and second housings 278, 280 and first and second sliders 282, 284 that are slidable relative to their respective first and second housings 278, 280. For instance, the first slider 282 can be retracted or extended relative to the first housing 278 along a first telescoping direction TP1, which in this example is parallel with the axial direction A. The first fitting 266 can be connected to a distal end of the first slider 282. When the first slider 282 is at a desired position, a first lock 286 (e.g., a pin, bolt, etc.) can secure the first slider 282 in place relative to the first housing 278. Similar to the first slider 282, the second slider 284 can be retracted or extended relative to the second housing 280 along a second telescoping direction TP2, which in this example is parallel with the axial direction A. The second fitting 268 can be connected to a distal end of the second slider 284. When the second slider 284 is at a desired position, a second lock 288 (e.g., a pin, bolt, etc.) can secure the first slider 282 in place relative to the first housing 278. Advantageously, by telescoping the first and second sliders 282, 284, the first attachment assembly 252 can readily adjust to the spacing (e.g., axial spacing) between the first and second frames 106, 108 (FIG. 2).

In some aspects, the second attachment assembly 254 (FIG. 2) can be configured in a same or similar manner as the first attachment assembly 252 of FIG. 6. In yet other aspects, the first attachment assembly 252 and/or the second attachment assembly 254 can be arranged to have only a single sliding extender while the other extender can be stationary.

Further, in some example aspects, the holes defined by the fittings (e.g., fittings 266, 270 and fittings 268, 272) can be match drilled to existing holes on the airplane structure. For instance, with reference to FIGS. 2 and 5, the first frame 106 at the first portion 110 can define a pattern of holes. The holes defined by the first fitting 266 and the holes defined by the first bookend fitting 270 can be drilled to match the existing holes defined by the first frame 106 at the first portion 110. Similarly, the second frame 108 at the first portion 110 can define a pattern of holes. The holes defined by the second fitting 268 and the holes defined by the second bookend fitting 272 can be drilled to match the existing holes defined by the second frame 108 at the first portion 110. The holes of the fittings of the second attachment assembly 254 can likewise be drill matched to the holes of the first and second frames 106, 108 at the second portion 112. Such drill matching can prevent or reduce the need for extra holes in the airplane structure and allows for precise loading for controlling deflection of the airplane structure. The drill-matched fittings can be swapped with replacement fittings (e.g., fittings that have not been drill matched or with fittings having standard hole patterns) for future uses of the brace 200, and the used fittings can be saved for future use or discarded as desired. Accordingly, it will be appreciated that the fittings can be interchangeable or sacrificial.

With reference to FIG. 2, the brace 200 can include one or more sensors to measure one or more operating parameters of the brace 200, such as an actuator force and/or strain. For instance, as illustrated in FIG. 2, the brace 200 includes a load cell 290 placed in-line with the actuator 240. The load cell 290 functions to monitor an actuator force applied by the actuator 240, e.g., in real time. Also, for the example of FIG. 2, the brace 200 includes a strain gauge 292 installed on the bar 250. The strain gauge 292 can be used to actively determine how far the brace 200 is moving the fuselage 100.

Such sensors can enable the brace 200 to be adjusted (e.g., in real time) during use based at least in part on the load and/or strain reported by the load cell 290 and/or strain gauge 292. This can ensure that the brace 200 accurately controls deflection of the structure without overloading it.

In some aspects, all or various components of the brace 200 can be formed of steel for high stiffness. For instance, the first and second legs 202, 204, the bar 250, the first and second attachment assemblies 252, 254, etc. can be formed of steel. The high stiffness of the steel components can allow for maintaining better positional accuracy of the first and second legs 202, 204 and tighter control over the deflection of the fuselage 100. Steel can also make such components less susceptible to damage during the installation process and while mechanics are working around the brace 200.

Figure 7:
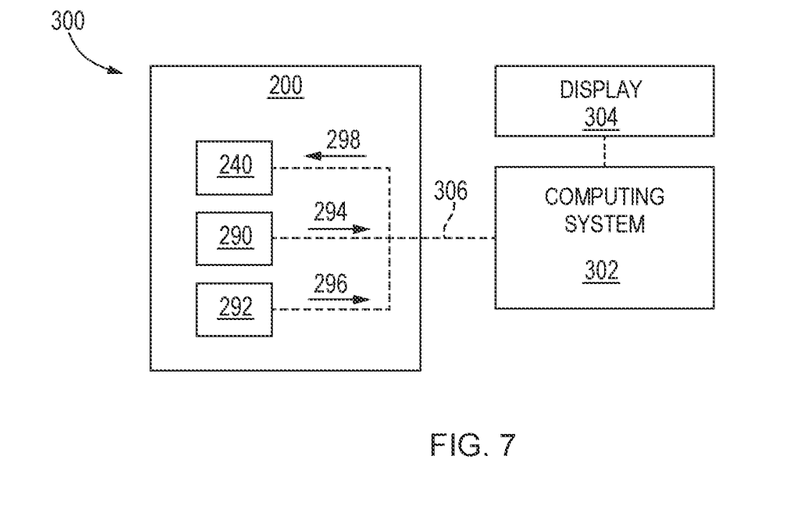
FIG. 7 is a schematic system diagram of one example repair system employing the brace of FIG. 2.
Figure 10:
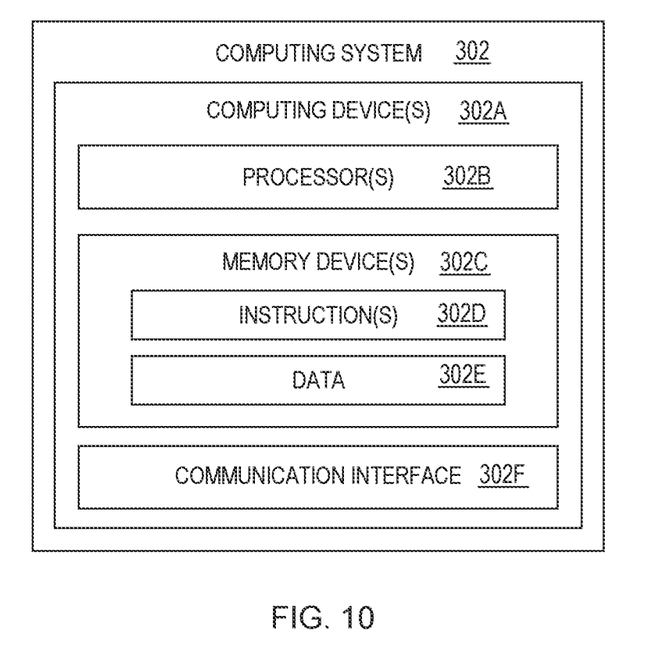
FIG. 10 is a block diagram of an example computing system for a repair system in accordance with various aspects of the present disclosure.

FIG. 7 is a schematic system diagram of one example repair system 300 employing the brace 200. As illustrated in FIG. 7, the repair system 300 can include, among other things, the brace 200, a computing system 302, and a display 304. The computing system 302 can be communicatively coupled with one or more components of the brace 200, e.g., via a communication bus 306 having one or more wired or wireless communication links. The computing system 302 can also be communicatively coupled with the display 304. The computing system 302 can be configured as shown in FIG. 10, for example. In some aspects, with the brace 200 coupled with a structure, e.g., the fuselage 100 of FIGS. 1A, 1B, and 2, the load cell 290 and/or the strain gauge 292 can provide sensor feedback 294, 296 to the computing system 302. In some aspects, the computing system 302 can automatically control the actuator 240 via one or more control signals 298 based at least in part on the sensor feedback 294, 296. The actuator 240 can be controlled by target applied load and/or by absolute displacement of the actuator 240, e.g., in a closed loop system. The loads, strains, and other information can be presented to an operator via the display 304. In other aspects, the sensor feedback 294, 296 and/or a determined target displacement or load can be presented to a user, e.g., on the display 304, and the user can adjust the actuator based at least in part on the feedback or presented target displacement or load.

Figure 8:
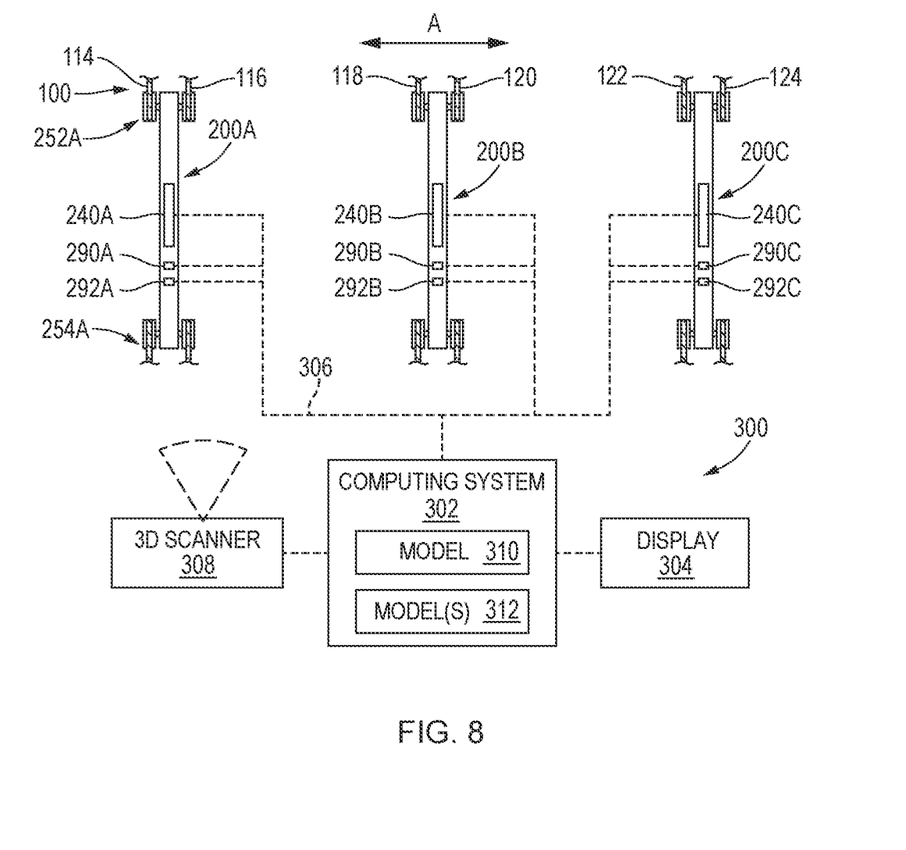
FIG. 8 is a schematic system diagram of an example repair system controlling a plurality of braces in a coordinated manner.

FIG. 8 is a schematic system diagram of the repair system 300 controlling a plurality of braces in a coordinated manner. In some instances, multiple braces can be installed at any location along the length of the fuselage 100 depending on the extent of the damage and how much structure needs to be removed/replaced. This can allow for more extensive disassembly of the structure than is possible with current solutions, for example.

As shown in FIG. 8, a first brace 200A is coupled with first and second frames 114, 116 of the fuselage 100 via first and second attachment assemblies 252A, 254A. A second brace 200B is coupled with third and fourth frames 118, 120 of the fuselage 100 via first and second attachment assemblies 252B, 254B. A third brace 200C is coupled with fifth and sixth frames 122, 124 of the fuselage 100 via first and second attachment assemblies 2520, 254C. The braces 200A, 200B, 200C are arranged at different axial positions along the fuselage 100, and each one of the braces 200A, 200B, 200C can be configured in a similar manner as the brace 200 described herein. The braces 200A, 200B, 200C can respectively include actuators 240A, 240B, 240C, load cells 290A, 290B, 290C, and strain gauges 292A, 292B, 292C. The actuators and sensors can be communicatively coupled with the computing system 302 via the communication bus 306. In some aspects, as shown in FIG. 8, the repair system 300 can include a 3D scanner 308 for scanning the fuselage 100.

In some aspects, the computing system 302 can control, based at least in part on sensor feedback from each one of the plurality of braces 200A, 200B, 200C, the actuators 240A, 240B, 240C in coordination so as to distribute a load applied to the fuselage 100 according to a predetermined distribution. For instance, the actuators 240A, 240B, 240C can be controlled to adjust or maintain their positions or applied loads so as to distribute the load applied to the fuselage 100 according to a predetermined distribution. In some example aspects, the predetermined distribution can be an even distribution, or stated differently, a distribution in which each actuator 240A, 240B, 240C applies an equal force on the fuselage 100, or on their respective frames 114, 116, 118, 120, 122, 124. In other example aspects, the predetermined distribution can be an uneven load distribution in which the load is focused in one or more areas by controlling the actuators 240A, 240B, 240C of the braces 200A, 200B, 200C to apply different loads. Such an uneven distribution can be useful in deflecting a portion of the fuselage 100 that has a greater deviation from a baseline relative to other portions of the structure. By way of example, the damage to the fuselage 100 may result in the first and second frames 114, 116 deviating from a baseline more than the other frames 118, 120, 122, 124. In such an example, the actuator 240A of the first brace 200A can apply a greater load on the first and second frames 114, 116 compared to the loads applied by the actuators 240B, 240C apply to their respective frames 118, 120, 122, 124. In this way, the actuators 240A, 240B, 240C can be controlled in a coordinated manner to control the overall load on, and deflection of, the fuselage 100.

In some further aspects, the 3D scanner 308 can be used to scan the fuselage 100, with the braces 200A, 200B, 200C coupled to their respective frames 116-124. The scanned data (e.g. point cloud data) can be routed to the computing system 302 and the computing system can generate a model 310 of the fuselage 100 based at least in part the scanned data. The computing system 302 can then compare the model 310 to a baseline model 312 to determine a deviation, or 3D differences between the model 310 and the baseline model 312. The baseline model 312 can be a digital twin of the fuselage 100 at production, delivery, or some previous time point. In such aspects, based at least in part on the deviation, the actuators 240A, 240B, 240C can be adjusted so as to pivot, or maintain the position of, the first and second legs of their respective braces 200A, 200B, 200C so as to control the load on, and deflection of, the fuselage 100, which may maintain or urge the fuselage 100 toward its baseline shape.

Figure 9:
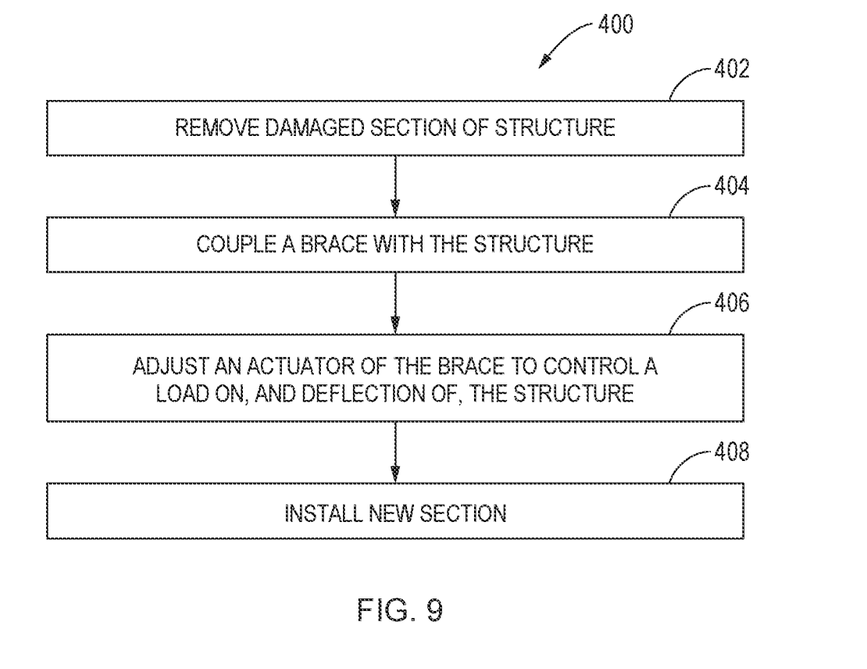
FIG. 9 is a flow diagram for a method of coupling a brace to a structure.

FIG. 9 is a flow diagram for a method 400 of coupling a brace to a structure, such as an airplane fuselage.

At 402, the method 400 can include removing a damaged section of the structure. For instance, the structure can be an airplane fuselage and the keel or some other portion of the fuselage can be become damaged, e.g., during a landing. The damaged section of the fuselage can be removed by any suitable technique, rendering a fuselage with a removed section or portion. In some instances, such as before or after removing the damaged section (or both before and after), it may be beneficial to brace the undamaged areas of the fuselage with a brace so that the shape of the fuselage is maintained and so that new structural components can be installed while maintaining tight tolerances and no or negligible preload. Accordingly, a brace can be coupled with the undamaged sections of the fuselage as explained below.

At 404, the method 400 can include coupling a brace to a structure so that a first attachment assembly of the brace couples to a first portion of the structure and a second attachment assembly of the brace couples to a second portion of the structure. For instance, the structure (e.g., a fuselage) can include a first frame and a second frame spaced from the first frame (e.g., axially spaced). Coupling the brace to the structure can include coupling the first attachment assembly to the first frame and the second frame so that a first fitting and a first bookend fitting are coupled with one another with the first frame sandwiched therebetween and so that a second fitting and a second bookend fitting are coupled with one another with the second frame sandwiched therebetween, an example of which is shown in FIG. 2 with the first attachment assembly 252 coupled to the first and second frames 106, 108 at the first portion 110. Coupling the brace to the structure can also include coupling the second attachment assembly to the first frame and the second frame so that a first fitting and a first bookend fitting of the second attachment assembly are coupled with one another with the first frame sandwiched therebetween and so that a second fitting and a second bookend fitting of the second attachment assembly are coupled with one another with the second frame sandwiched therebetween, an example of which is shown in FIG. 2 with the second attachment assembly 254 coupled to the first and second frames 106, 108 at the second portion 112. The first portion and the second portion of the structure can be spaced by a removed section of the structure.

In some implementations, in coupling the first attachment assembly with the structure, the method 400 can include drilling holes in the first fitting and in the first bookend fitting to match a pattern of existing holes in the first frame at the first portion. Drill matching the holes can prevent or reduce the need for extra holes in the structure and allows for precise loading for controlling deflection of the structure. In addition, in some implementations, the method 400 can further include drilling holes in the second fitting and in the second bookend fitting to match a pattern of existing holes in the second frame at the first portion. Moreover, in coupling the second attachment assembly with the structure, the method 400 can include drilling holes in the first fitting and in the first bookend fitting of the second attachment assembly to match a pattern of existing holes in the first frame at the second portion. In addition, in some implementations, the method 400 can further include drilling holes in the second fitting and in the second bookend fitting of the second attachment assembly to match a pattern of existing holes in the second frame at the second portion. Further, in some implementations, telescoping sliders of the extenders can be retracted or extended to fit the brace to the first and second frames.

In some further implementations, when the brace is coupled with the structure (e.g., a fuselage), the brace can be arranged to avoid obstacles that may be present within the fuselage. In such implementations, the brace is coupled with the structure in such a way that the first and second legs extend from the first and second attachment assemblies, respectively, inward toward the longitudinal centerline (generally along a radial direction) so that the bar is arranged inward of the fuselage along the radial direction and the actuator is arranged inward of the bar along the radial direction. Further, in such implementations, the bar is coupled with the first leg at a mid-span point of the first leg or to a point that is between the mid-span point and an end of the first leg opposite the first attachment assembly, and the bar is coupled with the second leg at a mid-span point of the second leg or to a point that is between the mid-span point of the second leg and an end of the second leg opposite the second attachment assembly. In this way, the brace is arranged to go "up and over" such obstacles.

At 406, the method 400 can include adjusting an actuator of the brace to pivot first and second legs of the brace relative to respective first and second pivot points so as to control a load on, and deflection of, the structure. The first attachment assembly can be coupled with the first leg and the second attachment assembly can be coupled with the second leg. The first pivot point can be defined at a first pivot joint where a bar is coupled with the first leg and the second pivot point can be defined at a second pivot joint where the bar is coupled with the second leg. The actuator can be adjusted manually or automatically.

When the actuator is adjusted so as to move the first ends of the first and second legs closer together (the ends of the first and second legs to which the actuator assembly is coupled), the bar of the pivot assembly maintains the spacing or offset between the first and second legs but the first leg is allowed to pivot about the first pivot point (e.g., in a clockwise direction) and the second leg is allowed to pivot about the second pivot point (e.g., in a counterclockwise direction). Moving the first ends of the first and second legs closer together effectively moves the second ends (the ends of the first and second legs opposite to which the actuator assembly is coupled) further apart, which causes the first and second portions of the structure to move further apart. In contrast, when the actuator moves the first ends of the first and second legs further apart, the bar of the pivot assembly maintains the spacing or offset between the first and second legs but the first leg is allowed to pivot about the first pivot point (e.g., in a counterclockwise direction) and the second leg is allowed to pivot about the second pivot point (e.g., in a clockwise direction). Moving the first ends of the first and second legs further apart effectively moves the second ends closer together, which causes the first and second portions of the structure to move closer together. When the actuator maintains the spacing between the first ends of the first and second legs, the first and second legs do not rotate or pivot relative to their respective pivot points. Accordingly, the actuator is arranged to pivot, or maintain a position of, the first leg relative to the first pivot point and to pivot, or maintain the position of, the second leg relative to the second pivot point so as to control a load on, and deflection of, the structure to which the brace is coupled.

In some implementations, the actuator can be adjusted based at least in part on feedback from a strain gauge arranged on the bar. Additionally or alternatively, the actuator can be adjusted based at least in part on feedback from a load cell arranged in-line with the actuator. In some implementations, the feedback can be used to adjust the actuator automatically. In other implementations, the feedback or a determined target displacement or load can be presented to a user, e.g., on a display, and the user can adjust the actuator based at least in part on the feedback or presented target displacement or load.

In some further implementations, the method 400 can include scanning the structure. In some implementations, the structure can be scanned with the brace coupled with the structure. The method 400 can also include generating a model of the structure based at least in part the scanning, e.g., a 3D model. The method 400 can further include comparing the model to a baseline model (e.g., a digital twin of the fuselage at production or at delivery). The model can be compared to the baseline model to determine a deviation, or rather, a deviation from the baseline model. In such implementations, the actuator can be adjusted based at least in part on the deviation, e.g., to control the load on, and the deflection of, the structure so as to maintain or urge the structure toward its baseline shape.

In yet other implementations, the brace can be one of a plurality of braces coupled with the structure. For instance, the braces can be coupled with respective axially-spaced frames of a fuselage. The method 400 can include controlling, based at least in part on sensor feedback from each one of the plurality of braces, an actuator of each one of the plurality of braces in coordination so as to distribute a load applied to the structure according to a predetermined distribution. The actuators can be controlled to adjust or maintain their positions so as to distribute the load applied to the structure according to a predetermined distribution. In some example aspects, the predetermined distribution can be an even distribution, or stated differently, a distribution in which each actuator applies an equal force on the structure. In other example aspects, the predetermined distribution can be an uneven load distribution in which the load is focused in one or more areas by controlling the actuators of the braces to apply different loads. Such an uneven distribution can be useful in deflecting a portion of the structure that has a greater deviation from a baseline relative to other portions of the structure.

In some example aspects, operations 404 and 406 of the method 400 can occur prior to operation 402.

At 408, the method 400 can include installing a new section to replace the damaged section. The brace can be coupled with the structure during the installation of the new section. The brace, or braces, can control the load on, and deflection of, the structure so that a repaired structure with a replacement or new section installed in the removed section is within a satisfactory specification. The brace, or braces, can brace the undamaged areas of the structure so that the shape of the structure is maintained and so that new structural components can be installed while maintaining tight tolerances and no or negligible preload.

FIG. 10 is a block diagram of the computing system 302 in accordance with various aspects of the present disclosure. As shown in FIG. 10, the computing system 302 can include one or more processor(s) 302B and one or more memory device(s) 302C. The one or more processor(s) 302B and the one or more memory device(s) 302C can be embodied in one or more computing devices 302A, such as a desktop computer, iPad, laptop, etc. The one or more processor(s) 302B can include any suitable processing device, such as a microprocessor, microcontroller, integrated circuit, logic device, or other suitable processing device. The one or more memory device(s) 302C can include one or more computer-readable medium, including, but not limited to, non-transitory computer-readable medium, RAM, ROM, hard drives, flash drives, and other memory devices.

The one or more memory device(s) 302C can store information accessible by the one or more processor(s) 302B, including computer-readable instructions 302D or computer-readable program code that can be executed by the one or more processor(s) 302B. The instructions 302D can be any set of instructions that, when executed by the one or more processor(s) 302B, cause the one or more processor(s) 302B to perform operations. The instructions 302D can be software written in any suitable programming language or can be implemented in hardware. The memory device(s) 302C can further store data 302E that can be accessed by the processors 302B. For example, the data 302E can include any of the data noted herein. The data 302E can include one or more table(s), function(s), algorithm(s), model(s), equation(s), libraries, etc. according to example aspects of the present disclosure.

The computing system 302, or the computing device(s) 302A thereof, can include a communication interface 302F used to communicate with other components. The communication interface 302F can include any suitable components for interfacing with one or more network(s), including for example, transmitters, receivers, ports, controllers, antennas, or other suitable components.

In the current disclosure, reference is made to various aspects. However, it should be understood that the present disclosure is not limited to specific described aspects. Instead, any combination of the following features and elements, whether related to different aspects or not, is contemplated to implement and practice the teachings provided herein. Additionally, when elements of the aspects are described in the form of "at least one of A and B," it will be understood that aspects including element A exclusively, including element B exclusively, and including element A and B are each contemplated. Furthermore, although some aspects may achieve advantages over other possible solutions and/or over the prior art, whether or not a particular advantage is achieved by a given aspect is not limiting of the present disclosure. Thus, the aspects, features, aspects and advantages disclosed herein are merely illustrative and are not considered elements or limitations of the appended claims except where explicitly recited in a claim(s).

As will be appreciated by one skilled in the art, aspects described herein may be embodied as a system, method or computer program product. Accordingly, aspects may take the form of an entirely hardware aspect, an entirely software aspect (including firmware, resident software, micro-code, etc.) or an aspect combining software and hardware aspects that may all generally be referred to herein as a "circuit," "module" or "system." Furthermore, aspects described herein may take the form of a computer program product embodied in one or more computer readable storage medium (s) having computer readable program code embodied thereon.

Program code embodied on a computer readable storage medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to aspects of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various aspects of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While the foregoing is directed to aspects of the present disclosure, other and further aspects of the disclosure may be devised without departing from the basic scope thereof, and the scope thereof is determined by the claims that follow.

What is claimed is:

1. A brace, comprising:
   a first leg;
   a second leg offset from the first leg;
   a pivot assembly having a bar pivotably coupled with the first leg to define a first pivot point and pivotably coupled with the second leg to define a second pivot point;
   first and second attachment assemblies coupled with the first leg and the second leg, respectively, and each arranged to couple to a portion of a structure; and
   an actuator assembly coupling the first leg with the second leg and having an actuator arranged to pivot the first leg relative to the first pivot point and to pivot the second leg relative to the second pivot point so as to control a load on, and deflection of, the structure,
   wherein the bar is static and configured to maintain a spacing between the first and second pivot points.

2. The brace of claim 1, wherein the first attachment assembly is arranged to couple to a first portion of the structure and the second attachment assembly is arranged to couple to a second portion of the structure, and wherein the first and second portions of the structure are separated by a damaged section or a removed section of the structure.

3. The brace of claim 1, wherein:
   the first leg has a first end and a second end, and wherein the actuator assembly is pivotably coupled with the first end of the first leg and the first attachment assembly is coupled with a first foot of the first leg at the second end of the first leg, and
   the second leg has a first end and a second end, and wherein the actuator assembly is coupled with the first end of the second leg and the second attachment assembly is coupled with a second foot of the second leg at the second end of the second leg.

4. The brace of claim 1, wherein the first attachment assembly has a first attachment fitting having a coupler, first and second extenders, and first and second fittings, and wherein the coupler is coupled with the first leg, the first and second extenders extend outward from the coupler in opposing directions, and the first fitting is connected to the first extender and the second fitting is connected to the second extender.

5. The brace of claim 4, wherein the first attachment assembly has a first bookend fitting and a second bookend fitting, and wherein the first fitting and the first bookend fitting are adapted to receive, and secure, a first frame of the structure therebetween and the second fitting and the second bookend fitting are adapted to receive, and secure, a second frame of the structure therebetween, the first frame and the second frame being spaced from one another.

6. The brace of claim 4, wherein the first extender has a first housing and a slider that is slidable relative to the first housing, and wherein the first fitting is connected to the slider.

7. The brace of claim 1, wherein the first leg has a backbone, a flange extending from the backbone, and a foot, and wherein the actuator assembly and the pivot assembly are coupled with the flange and the first attachment assembly is coupled with the foot.

8. The brace of claim 7, wherein a distance that the flange extends from the backbone varies along a length of the flange, and wherein a notch is defined between an actuator joint where the actuator assembly couples to the first leg and a pivot joint where the pivot assembly couples to the first leg, and wherein the flange tapers from the pivot joint to the foot.

9. The brace of claim 1, wherein the pivot assembly has a first clevis coupling the bar with the first leg and a second clevis coupling the bar with the second leg, and wherein the first and second clevises are coupled with the first and second legs at a first pivot joint and a second pivot joint, respectively.

10. The brace of claim 1, further comprising:
    a load cell placed in-line with the actuator.

11. The brace of claim 1, further comprising:
    a strain gauge arranged on the bar.

12. A repair system, comprising:
a brace, comprising:
- a first leg;
- a second leg offset from the first leg;
- a pivot assembly having a bar pivotably coupled with the first leg to define a first pivot point and pivotably coupled with the second leg to define a second pivot point;
- first and second attachment assemblies coupled with the first leg and the second leg, respectively, and each arranged to couple to a portion of a structure;
- an actuator assembly coupling the first leg and the second leg, the actuator assembly having an actuator;
- a sensor; and
a computing system comprising one or more processors and one or more memory devices storing a program, which, when executed by any combination of the one or more processors, causes the one or more processors to perform an operation, the operation comprising:
receiving feedback from the sensor; and
performing at least one of:
  i) causing, based at least in part on the feedback, the actuator to pivot, or maintain a position of, the first and second legs relative to the first and second pivot points, respectively, so as to control a load on, and deflection of, the structure; or
  ii) presenting the feedback or a target displacement or load associated with the brace determined based at least in part on the feedback.

13. The repair system of claim 12, wherein the first attachment assembly is arranged to couple to a first portion of the structure and the second attachment assembly is arranged to couple to a second portion of the structure, and wherein the first and second portions of the structure are separated by a damaged section or a removed section of the structure.

14. The repair system of claim 12, wherein:
the first leg has a first end and a second end, and wherein the actuator assembly is pivotably coupled with the first end of the first leg and a first attachment assembly is coupled with a first foot of the first leg at the second end of the first leg, and
the second leg has a first end and a second end, and wherein the actuator assembly is coupled with the first end of the second leg and a second attachment assembly is coupled with a second foot of the second leg at the second end of the second leg.

15. The repair system of claim 14, wherein the first attachment assembly has a first attachment fitting having a coupler, first and second extenders, and first and second fittings, and wherein the coupler is coupled with the first leg, the first and second extenders extend outward from the coupler in opposing directions, and the first fitting is connected to the first extender and the second fitting is connected to the second extender.

16. The repair system of claim 15, wherein the first attachment assembly has a first bookend fitting and a second bookend fitting, and wherein the first fitting and the first bookend fitting are adapted to receive, and secure, a first frame of the structure therebetween and the second fitting and the second bookend fitting are adapted to receive, and secure, a second frame of the structure therebetween, the first frame and the second frame being spaced from one another.

17. The repair system of claim 15, wherein the first extender has a first housing and a slider that is slidable relative to the first housing, and wherein the first fitting is connected to the slider.

18. The repair system of claim 12, wherein the pivot assembly has a first clevis coupling the bar with the first leg and a second clevis coupling the bar with the second leg, and wherein the first and second clevises are coupled with the first and second legs at a first pivot joint and a second pivot joint, respectively, and the bar is static so as to maintain a spacing between the first and second pivot points.

19. The repair system of claim 12, further comprising:
a load cell placed in-line with the actuator.

20. The repair system of claim 12, further comprising:
a strain gauge arranged on the bar.

* * * * *